Patented Feb. 23, 1943

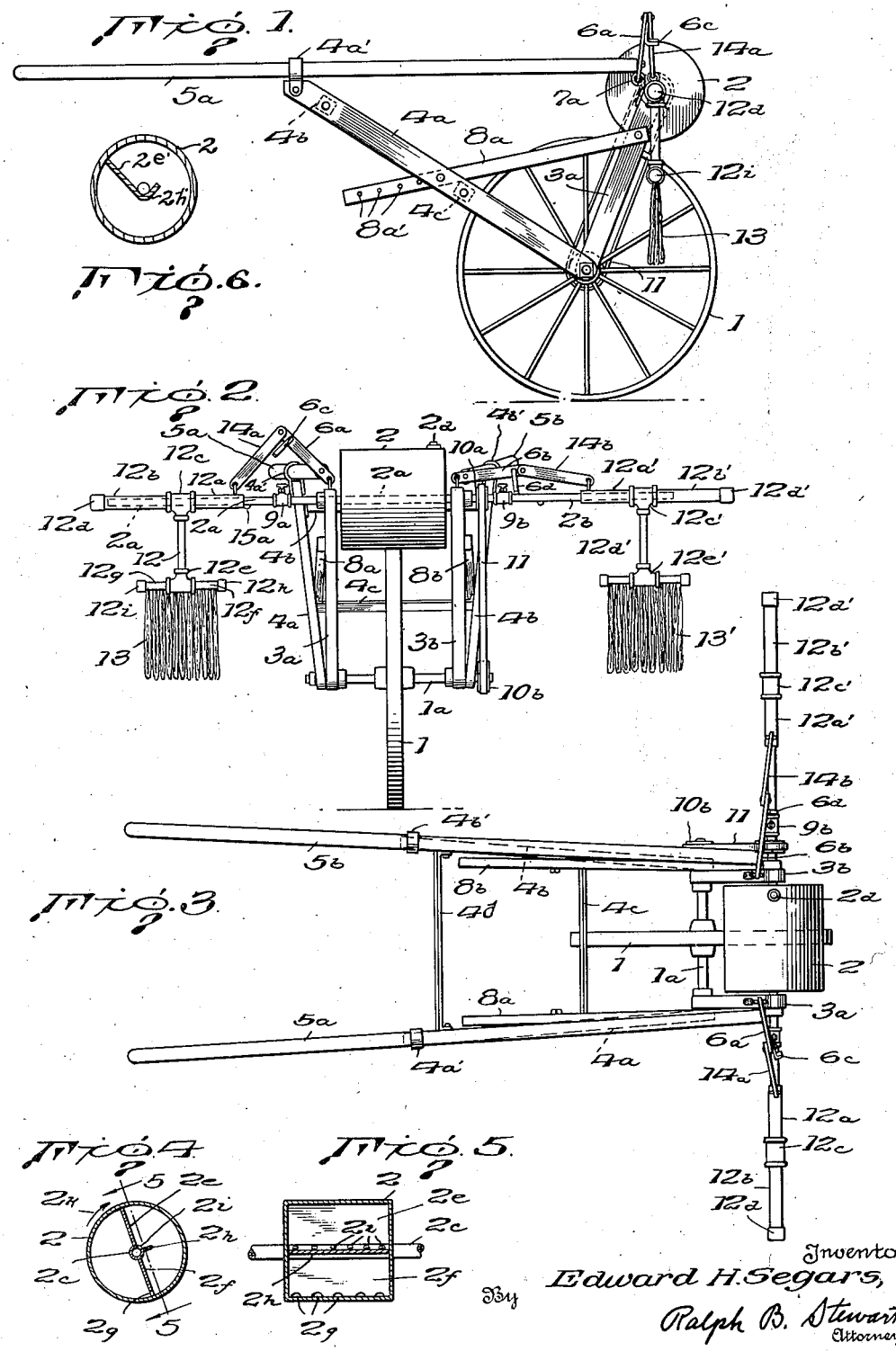

2,311,782

UNITED STATES PATENT OFFICE 2,311,782

MACHINE FOR TREATING PLANTS

Edward H. Segars, Lamar, S. C.

Application October 23, 1940, Serial No. 362,454

10 Claims. (Cl. 299—29)

My invention relates to a machine for treating plants. While my invention has been developed for the purpose of treating cotton plants with liquid insecticide to kill boll weevils, it is obvious that it may be employed for applying liquids generally to cotton or other plants.

An object of my invention is to devise a machine of simple construction for applying insecticide to growing plants arranged in rows.

A further object is to provide an improved arrangement for supplying liquid insecticide to a pair of wipers and for easily varying the lateral separation of the wipers to accommodate variations in the width of the rows.

A further object is to provide for the easy adjustment of the height of the wipers above the ground to accommodate plants of different stages of growth.

Still another object is to devise an improved container or reservoir for the insecticide or fluid used in the machine and for maintaining the fluid in a continuous state of agitation while the machine is in use, thereby insuring proper mixing of the insecticide solution.

Another object is to provide an improved form of wiper for wiping the insecticide over the plants.

A preferred embodiment of my invention is illustrated in the accompanying drawing in which Figure 1 is a side elevational view of the machine;

Figure 2 is a front elevational view of the machine;

Figure 3 is a plan view of the machine;

Figure 4 is a sectional view of Figure 1 taken along the line 4—4 showing the details of construction of the rotatable insecticide container or reservoir, and Figure 5 is a sectional view taken along line 5—5 of Figure 4.

Figure 6 is a sectional view like Figure 4 showing another baffle arrangement for the rotatable container or reservoir.

Referring to the drawing, the machine is provided with a supporting wheel 1 having an axle 1a which turns with the wheel. A drum 2 serving as a tank or reservoir for the insecticide, is supported above the wheel 1 by a pair of frame elements 3a, 3b extending between the axle 1a and a hollow shaft 2c passing through the center of the drum 2. It will thus be seen that the axle 1a is journaled in holes formed in the lower ends of frame members 3a and 3b while hollow shaft 2c passing through the drum 2 is journaled in holes formed in the upper ends of the frame members 3a and 3b. Suitable collars are arranged on the shaft 2c on opposite sides of frame members 3a and 3b to maintain these members in the proper position on this shaft. Also, suitable collars are arranged on axle 1a to hold frame members 3a and 3b in proper spaced relation. Another pair of frame members 4a and 4b are journaled at one end upon the axle 1a and extend rearwardly and upwardly from the axle as shown in Figure 1. A pair of spaced transverse bracing members 4c and 4d are arranged between the members 4a and 4b to maintain these members in proper spaced relation. A pair of substantially horizontal handles 5a and 5b are secured at their forward ends to the upper ends of frame members 3a and 3b respectively, these handles are preferably pivotally secured to frame members 3a and 3b to permit the handles to be turned about their longitudinal axes. For this purpose I have shown link elements 6a and 6b secured transversely across the forward ends of handles 5a and 5b, and ring elements 7a and 7b secured respectively to the upper ends of frame members 3a and 3b link with holes formed in the short ends of lines 6a and 6b as shown in Figure 2. The handles 5a and 5b pass loosely through loops 4a' and 5a' formed of strap metal and secured respectively to the ends of frame members 4a and 4b. Frame member 3a is secured to frame member 4a by a bracing member 8a as shown in Figure 1, and this bracing member is provided with a series of holes 8a' by which the point of connection to the member 4a may be varied and thereby vary the angular relation between frame members 3a and 4a. A similar adjustable bracing member 8b connects frame member 3b to frame member 4b. It is evident that by adjusting the point of attachment of braces 8a and 8b to members 4a and 4b the elevation of the tank 2 and the two wipers associated therewith may be varied.

The hollow shaft 2c of the drum 2 extends outwardly on both sides of the drum as shown at 2a and 2b, and stop cocks 9a and 9b are provided in each arm of the shaft as shown in Figure 2. A grooved pulley 10a mounted upon shaft 2c is connected by a belt 11 to a pulley 10b secured to axle 1a. By means of this arrangement the tank 2 and its supporting shaft 2c is rotated in accordance with the movement of the wheel 1.

A pair of wiper elements are slidably mounted on the outer ends 2a and 2b of shaft 2c and since these wiper elements are identical in construction, only one element will be described in detail. The supporting structure for each wiper involves a tubular portion consisting of two alined sleeve elements 12a and 12b joined by a T-connection 12c and telescoping over shaft extension 2a. The sleeve 12a fits closely around the shaft extension 2a but allows free sliding along the shaft and free rotation about the shaft. The sleeve 12b is larger than the sleeve 12a to provide for an annular space between the outer surface of the shaft extension 2a and the inner wall of the sleeve 12b. A cap 12d closes the outer end of the sleeve 12b. Extending downwardly from the T-connection 12c is a tubular element 12d provided with a T-connection 12e at the lower end thereof. A pair of tubular arms 12f and 12g extend in opposite directions from the T-connection 12e and parallel with the shaft 2a. The outer ends of tubular arms 12f and 12g are closed by suitable caps 12h and 12i respectively. A number of spaced holes are formed in the lower part of the arms 12f and 12g and in the T-connection 12e. Suitable strips of absorbent fabric 13 such as strips of cotton cloth, are threaded through these holes and the ends of the strips extend downwardly as shown in the drawing to form wiper strands which engage the growing plants and apply the liquid thereto.

Suitable link elements 12a and 14b are pivoted at one end to the inner ends of sleeve elements 12a and 12a' respectively, and the other ends of these links are pivotally connected to arms 6a and 6b. The pivoted connection between link 14a and sleeve 12a, and between link 14b and sleeve 2b, is such that sleeves 12a and 12b can be rotated through a substantial angle about the axis of their supporting shaft extensions. A suitable form of connection involves a ring secured to sleeve 12a and linking with a hole formed in the end of link 14a. By this construction it is possible to vary the lateral position of the wipers 13 with respect to the machine by simply rotating the handles 5a and 5b about their axes. Suitable stops or abutments 15a and 15b are secured to shaft extensions 2a and 2b to limit the inward movement of the wiper mounting sleeves 12a and 12a'. Suitable stops 6c and 6d are secured to arms 6a and 6b and cooperate with shaft extensions 2a and 2b to limit the rotation of arms 6a and 6b.

The drum 2 which serves as a reservoir for the liquid to be applied to the plants is preferably a cylindrical drum provided with a removable closure 2d for filling the drum. Located within the drum are two diametrically alined baffle plates 2e and 2f extending from the tubular shaft 2c to the inner surface of the outer wall of the drum. The baffle 2e is solid and has a fluid-tight connection with the shaft 2c and the walls of the drum, but suitable holes 2g are provided in the baffle 2f at or near the outer edge thereof where the same is secured to the cylindrical wall of the drum (see Figure 5). A third baffle plate 2h is secured to the hollow shaft 2c and extends outwardly from the shaft a short distance at an angle to the plate 2e as shown at Figure 4. A series of holes 2i are formed through the wall of hollow shaft 2c in the space between baffle plate 2e and plate 2h (see Figure 5). It will be seen that plates 2e and 2h in co-operation with hollow shaft 2c form a trough-like construction, the bottom of the trough being formed by hollow shaft 2c which includes the axis of rotation of the drum.

In Figure 4 the arrow 2k indicates the normal direction of rotation of the drum 2 during operation. The perforated baffle plate 2f acts as a stirring element to agitate the fluid mixture as the drum rotates. The baffle plate 2e comprising the trailing wall of the trough, in combination with the cylindrical wall of the drum, serves as a dipper element for raising the fluid from the lower part of the drum and causing it to flow into the trough-like construction. From this trough the fluid passes out of the drum at opposite ends thereof and into the hollow shaft extensions or conduits 2a and 2b. The fluid flows out of the ends of shaft extensions 2a and 2b into the enlarged sleeves 12b and 12b' and then back through the sleeves 12b and 12b', through the T-connections 12c and 12c' and then downwardly through tubes 12d and 12d', through T-connections 12e, 12e' and into the two arms 12f—12g on one side and 12f'—12g' on the other. The fabric wiper strips 13 and 13' become saturated with the fluid supplied to the arms 12f—12g and 12f' and 12g'.

In operation of the machine, the fluid to be applied to the plants is placed in drum 2, and the machine is propelled between two rows of plants to be treated. If the furrow between the two rows is in the middle of the rows, then the two wipers can be adjusted to be equally distant from the wheel 1, but if the rows are not symmetrical with respect to the furrow, then the wipers may be adjusted laterally by proper turning of the handles as described above. By proper adjustment of the bracing bars 8a and 8b, the machine may be adjusted so that the wiping strands 13, 13' are in proper position to engage the plants and to wipe the foliage with fluid. Also, by proper lateral adjustment of the wiper elements it is possible to keep the wiper elements in line with the rows where the rows are not uniform in distance of separation. As the machine is moved along, the wiper strands 13 engage with the plants, and since there is considerable friction between the strands and the leaves of the plants, the wiper head consisting of elements 12a and 12i inclusive, is caused to rotate slightly about the shaft extension 2a. Also, the friction of the wiper strands 13 on the leaves of the plant will cause the leaves to be turned over and the fluid will thus be applied to the underside of the leaves where it is most effective in exterminating the boll weevil. The weight of the part 12d to 12i inclusive will tend to bend the plants over and will thereby aid in turning the leaves over for application of the insecticide to the underside thereof. The pivoted mounting of the wiper supporting head permits the head to swing back when engaged by the taller plants in a row and thus avoid breaking of the taller plants. I have found that by providing a sufficiently small clearance between the sleeve 12a and the shaft extension 2a, no substantial leakage of the fluid occurs at this point, but it will be understood that suitable packing may be provided in this sliding connection if desired.

Stop cocks 9a and 9b are provided to cut off the fluid from the shaft extensions 2a and 2b while the drum 2b is being filled and while the machine is being transported to or away from the field.

The construction embodied in the reservoir or container as illustrated in Figures 4 and 5 provides for the continuous stirring or agitation of the liquid within the container, and at the same time provides for raising the liquid from the lowermost part of the container and discharging the same through the discharge outlets located at the axis of rotation of the container. It will be obvious to those skilled in the art that the perforated baffle plate 2f is not essential and may be omitted if desired (see Figure 6). It is also obvious that the angular position of the baffle plate 2h with respect to the plate 2e may be varied through wide limits without departing from the principle of my invention. It is not essential that the shaft 2c extend through the drum 2 as shown, but the shaft extensions 2a and 2b may be terminated at the opposite ends of the drum, in which case the trough-like construction would be formed of a single trough-like plate (as shown in Figure 6) arranged within the drum so that the axis of rotation of the drum is located within the trough near the bottom thereof, and the trailing wall 2e' of the trough corresponding to plate 2e would be imperforate and would extend to the outer wall of the drum, while the leading wall 2h' corresponding to the plate 2h would be terminated short of the outer wall of the drum or would be perforated to permit the liquid to flow around or through the same. Other modifications of my invention will be obvious to those skilled in the art and my protection is not to be limited except in accordance with the appended claims.

What I claim is:

1. In a liquid applying machine, the combination of a portable frame, a container for liquid, means for mounting said container on said frame for rotation about a horizontal axis, a liquid applying device carried by said frame, a conduit for connecting said device to said container at the axis of rotation thereof, and means embodied in said container and operated by the rotation of said container for raising liquid from below the axis of rotation of said container and discharging the same into said conduit.

2. In a liquid applying machine, the combination of a closed container for said liquid, means for mounting said container for rotation about a horizontal axis, an outlet conduit connected to said container at the axis of rotation thereof, means embodied in said container and being operated by rotation of said container for raising liquid from below the axis of rotation thereof and discharging the same into said conduit, and a liquid applying device connected to receive liquid from said conduit.

3. A machine according to claim 2 wherein the means for raising liquid within said container comprises a trough-like construction arranged within said container along the axis thereof and positioned so that the axis of rotation of said container is located within said trough near the bottom thereof, and the trailing wall of said trough is imperforate and extends to the outer wall of said container while the leading wall of said trough is formed to permit the flow of liquid around the same.

4. In a liquid applying machine, the combination of a portable frame, a container for said liquid comprising a drum having a hollow shaft running through the center thereof and extending beyond both ends of said drum, said hollow shaft and drum being mounted transversely of said frame for rotation about the axis of said shaft, means for rotating said hollow shaft and drum, a pair of liquid applying devices arranged on opposite sides of said frame and being connected in liquid supply relation to the ends of said hollow shaft, said hollow shaft being provided with perforations along the portion thereof lying within said drum, and a baffle plate located within said drum and extending from said hollow shaft to the periphery of said drum for raising liquid from the bottom portion of the drum and causing the same to flow in the perforations formed in said hollow shaft.

5. In a liquid applying machine, the combination of a portable frame, a container for said liquid comprising a drum having a hollow shaft running through the center thereof and extending beyond both ends of said drum, said hollow shaft and drum being mounted transversely of said frame for rotation about the axis of said shaft, means for rotating said hollow shaft and drum, a sleeve supported on each end of said hollow shaft in telescoping relation therewith whereby said sleeves may be adjusted laterally with respect to said frame, and said shaft may rotate without rotating said sleeves, a liquid applying device supported on each telescoping sleeve and being supplied with liquid through said sleeves, said hollow shaft being provided with perforations along the portion thereof lying within said drum, and a baffle plate located within said drum and extending from said hollow shaft to the periphery of said drum for raising liquid from the bottom portion of the drum and causing the same to flow in the perforations formed in said hollow shaft, and through the ends of said shaft to said liquid applying devices.

6. In a liquid applying machine, the combination of a portable frame, a container for said liquid comprising a drum having hollow shaft sections extending beyond both ends thereof and communicating with the interior thereof, means for mounting said drum on said frame for rotation about the axis of said shaft sections in a horizontal position, a sleeve supported on each section of said hollow shaft in telescoping relation therewith whereby said sleeves may be adjusted laterally with respect to said frame, and said shaft sections may rotate without rotating said sleeves, a liquid applying device supported on each telescoping sleeve and being supplied with liquid through said sleeves, and means located within said drum and being operated by the rotation of said drum for raising liquid from below the axis of rotation of said drum and discharging the same into the inner ends of said hollow shaft sections.

7. A machine according to claim 6 wherein said liquid applying devices each comprise a vertical conduit depending from each telescoping sleeve and having a horizontal conduit section supported at the lower end thereof, and a plurality of fabric strands are mounted in holes formed in said horizontal conduit section and extend downwardly therefrom.

8. A machine according to claim 6 and including a pair of handles for said machine mounted for rotation about their longitudinal axes, and means controlled by rotation of said handles for adjusting the lateral position of said telescoping sleeves on the ends of said hollow shaft.

9. An insecticide distributor comprising a drum, a rotatable shaft having a hollow passageway secured to and extending outwardly of said drum and supporting the drum for rotation, means carried by said shaft and rotatable therewith interiorly of the drum for feeding contents of the drum into said passageway, and insecticide applicator means carried by said shaft exteriorly of the drum.

10. A device of the character described comprising a drum for holding insecticide, a support, a shaft secured to and extending axially of said drum, means for rotatably mounting said drum and said shaft upon said support, a passageway in said shaft forming a conduit for distributing contents of the drum, a depending conduit connected to said shaft by a connection providing for rotation of said shaft while maintaining said depending conduit in depending relation with respect to said shaft, and an insecticide applicator connected to the lower end of said depending conduit.

EDWARD H. SEGARS.